United States Patent [19]
DiGiacomo et al.

[11] Patent Number: 5,937,990
[45] Date of Patent: Aug. 17, 1999

[54] TRANSMISSION WITH LOAD BRAKE

[75] Inventors: Anthony J. DiGiacomo, Wayne; Shijie Liu, Morris Plains; Khoi T. Vu; Alfred K. Tengan, both of Randolph; Robert L. Kowalski, Bloomfield, all of N.J.

[73] Assignee: GEC-Marconi Aerospace, Inc., Whippany, N.J.

[21] Appl. No.: 09/028,649

[22] Filed: Feb. 24, 1998

[51] Int. Cl.[6] .................................................. F16D 67/00
[52] U.S. Cl. .................................. 192/223.3; 192/111 B; 188/134
[58] Field of Search ................................ 192/8 R, 223.3, 192/111 B; 188/134

[56] References Cited

U.S. PATENT DOCUMENTS

| | | | |
|---|---|---|---|
| 2,221,014 | 11/1940 | Willamson | 192/111 B |
| 3,536,169 | 10/1970 | Arnold | 188/82.1 |
| 3,621,958 | 11/1971 | Klemm | 188/134 X |
| 3,835,967 | 9/1974 | Kerr | 188/134 |
| 3,898,817 | 8/1975 | Capewell et al. | 188/134 X |
| 4,030,578 | 6/1977 | Cacciola et al. | 188/134 |
| 4,046,235 | 9/1977 | Shutt | 188/134 |
| 4,579,201 | 4/1986 | Tiedeman | 188/134 X |
| 4,597,477 | 7/1986 | Miller | 188/134 X |
| 4,676,352 | 6/1987 | Randolph | 192/8 R |
| 4,693,349 | 9/1987 | Tysver | 188/134 X |
| 4,822,094 | 4/1989 | Oldfather et al. | 296/65.1 |
| 4,850,458 | 7/1989 | Allan et al. | 188/134 |
| 5,097,916 | 3/1992 | Brandstadter | 180/9.1 |
| 5,738,183 | 4/1998 | Nakajima et al. | 180/444 |

FOREIGN PATENT DOCUMENTS

| | | | |
|---|---|---|---|
| 856417 | 12/1960 | United Kingdom | 192/8 R |
| 1341707 | 12/1973 | United Kingdom | 192/8 R |

*Primary Examiner*—Charles A. Marmor
*Assistant Examiner*—Ha Ho
*Attorney, Agent, or Firm*—Fish & Neave; Jeffrey H. Ingerman; Joel Weiss

[57] ABSTRACT

A transmission with a load brake has a ball spline and a stabilizer ring for reducing chatter, a seal for preventing leakage, and an adjustment mechanism for extending the effective life of the brake disk stack. In the past, transmissions equipped with Weston brakes have experienced significant problems with instability and chatter. The present invention overcomes the problems of instability and chatter by introducing a ball spline at the junction between the output shaft and the loading assembly. The ball spline reduces friction caused by the axial movement of the output cam of the loading assembly. Also, the invention introduces a stabilizer ring around the loading assembly to reduce instability and chatter caused by the angular and transverse movement of the loading assembly. The invention also may also utilize a fluid damper in place of the stabilizer ring to reduce instability and chatter caused by the angular and transverse movement of the loading assembly. The invention substantially reduces leakage of transmission fluid by placing a seal including two sealing members around the opening in the casing of the transmission through which the output shaft passes. A layer of relatively high-viscosity grease is introduced between the two sealing members to provide a dam against leakage of transmission fluid. An adjustment mechanism may be used to reconfigure the brake disk stack to its original settings after a pre-determined number of cycles of use of the transmission.

15 Claims, 14 Drawing Sheets

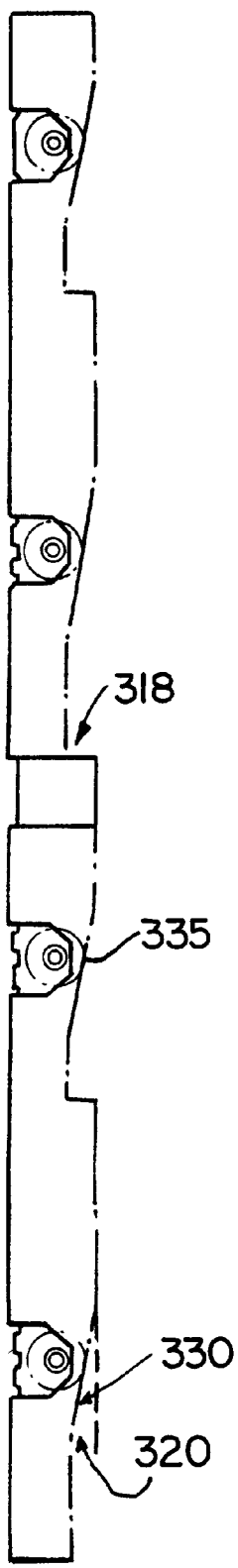
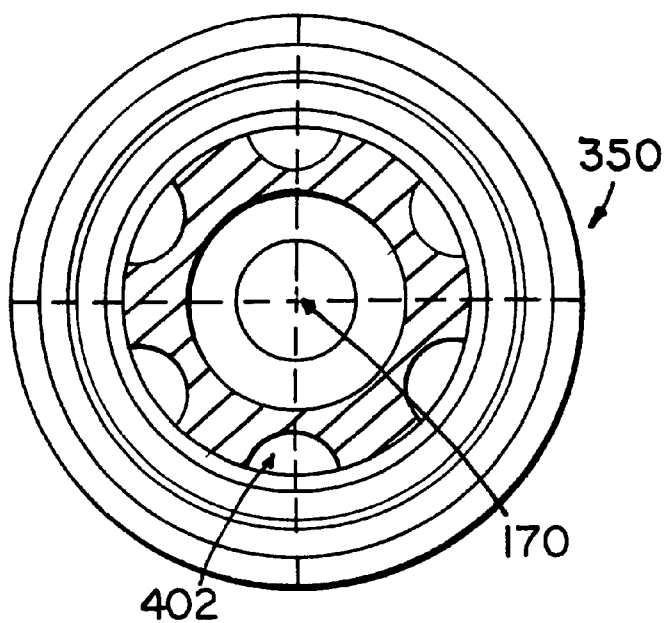
FIG. 6
FIG. 8

TRANSMISSION WITH LOAD BRAKE

STATE REGARDING GOVERNMENT RIGHTS

The U.S. Government has rights in this invention, pursuant to Prime Procurement Contract No. DAAH01-95-C-0329 between Lockheed-Martin Vought Systems Corp. and the United States Government, under purchase order P-3199672 between Lockheed-Martin Vought Systems Corp. and GEC-Marconi Aerospace, Inc.

BACKGROUND OF THE INVENTION

This invention relates to transmissions equipped with load brakes. Specifically, this invention relates to transmissions utilizing the class of multiple-disk load brakes known generically as Weston brakes. Weston brakes provide automatic brake application in response to a load.

The Weston load brake has been used for many years. One of its unique characteristics is that it feeds back torque or rotational force to the multiple disk brake responsively to the torque or rotational force produced by the load to the brake. This feedback from the load to the brake permits the brake to automatically adjust to the force produced by the load. Optimally, the feedback system of a Weston brake provides smooth performance of the brake over a wide range of loading conditions and temperatures.

Historically, however, stable operation of Weston brakes has been difficult to attain. Under certain conditions of loading and temperature, Weston brakes are unstable and tend to chatter.

Often, this instability is the result of friction produced in the feedback device. One type of feedback device used with a Weston brake includes an input cam and an output cam—the input cam transmits motor torque to the output cam, and the output cam transmits the torque from the input cam to the load. A brake disk stack rotates with the load. The cams have opposing ramps where the cams engage one another. If the output cam tends to overrun the input cam, its ramps ride up over the corresponding ramps of the input cam. This action forces the cams to move axially apart, translating the output cam axially toward the brake disk stack. This axial motion of the output cam applies force between the output cam and the brake disk stack, compressing the brake disk stack, thereby applying a braking force. The greater the overrun, the greater the axial spread of the cams and the greater the braking force. Thus, greater braking force is created in response to the greater load.

Accordingly, the feedback system of the Weston brake depends on free axial movement of the output cam in order to apply force to the brake disk stack. In known applications of Weston brakes, the output cam is affixed to the output shaft by a conventional spline located on the output shaft, to provide continuous transmission of torque. The output cam moves axially along the spline to transmit various levels of axial force to the brake disk stack. A conventional spline transmits torque when the flanks of the teeth on one member press against the flanks of the corresponding teeth of the mating member. This pressure not only produces driving torque, it produces sliding friction as well, which impedes the ability of the output cam to adjust its axial pressure on the brake disk stack smoothly and continuously. Such uneven movement makes the brake unstable and causes chatter.

Movement of the cams transversely, or rotationally about an axis other than the shaft axis, also causes instability and chatter in the brake.

Viscous damping of the transmission by the introduction of transmission fluid is helpful in increasing stability of the brake and in limiting chatter. In some applications, however, transmission fluid may leak, which is undesirable.

Additionally, after repeated use of the Weston brake, the brake surfaces wear and the distance between the surfaces increases. When the brake surfaces have worn down sufficiently, the brake ceases to be effective and must be replaced.

In view of the foregoing, it would be desirable to provide a transmission equipped with a Weston brake that reduces instability of the brake over a wide range of loading and temperature.

It would further be desirable to provide a transmission equipped with a Weston brake in which the effective life of the Weston brake is extended.

It would still further be desirable to provide a transmission filled with a transmission fluid in which the leakage of the transmission fluid is substantially reduced.

SUMMARY OF THE INVENTION

It is an object of this invention to provide a transmission equipped with a Weston brake that reduces instability of the brake over a wide range of loading and temperature.

It is a further object of this invention to provide a transmission equipped with a Weston brake in which the effective life of the Weston brake is extended.

It is a still further object of this invention to provide a transmission filled with a transmission fluid in which the leakage of the transmission fluid is substantially reduced.

In accordance with this invention, a transmission with a load brake is provided. The transmission is adapted for transmitting power from a motor to a load. The transmission has a casing, an input drive section adapted for rotary drive by the motor, an output drive section adapted for coupling to the load, a loading assembly for transmitting torque from the input section to the output section, and two different means for reducing chatter found in the loading assembly. The output drive section includes an output shaft, a cylindrical brake disk carrier disposed about the output shaft, a brake disk stack including one portion of brake disks constrained against rotating relative to the casing, and a second portion of brake disks constrained to rotate with the brake disk carrier to the output shaft, the first portion of brake disks alternating in the stack with the second portion of brake disks, each of the brake disks being free to move axially, and a one-way clutch between the output shaft and the brake disk carrier, whereby when the output shaft rotates in one direction, the one-way clutch rotationally locks the brake disk carrier, and when the output shaft rotates in the opposite direction, the one-way clutch allows the output shaft to rotate independently of the brake disk carrier. The loading assembly includes an input cam movably connected to an output cam. The output cam drives the output drive section and also applies axial pressure to the second portion of brake disks, thereby compressing the second portion of brake disks against the first portion of brake disks. The first means for reducing chatter reduces the chatter caused by the axial movement of the input cam and the output cam relative to one another. The second means for reducing chatter reduces the chatter caused by the angular movement of the input cam and the output cam relative to one another.

The transmission may be filled with transmission fluid of a certain viscosity. In such an embodiment, the output shaft extends through an opening in the casing, and the transmission comprises a seal for preventing leakage of the transmission fluid through the opening. The seal comprises a first annular seal member extending around the output shaft and a second annular seal member extending around the output shaft. The second annular seal member is spaced axially away from the first annular seal member, thereby forming a seal space between the first and second annular seal members. The seal space is filled with a sealing medium having a greater viscosity than the viscosity of the transmission fluid.

The transmission may also have an adjustment mechanism which allows the user to extend the effective life of the brake disk stack.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 6 is a fragmentary side elevational view of another embodiment of a cam from a loading assembly of a transmission according to the invention;

FIG. 8 is an end elevational view of one embodiment of an output shaft of a transmission according to the invention taken from line 8—8 of FIG. 7;

DETAILED DESCRIPTION OF THE INVENTION

Figure 1:
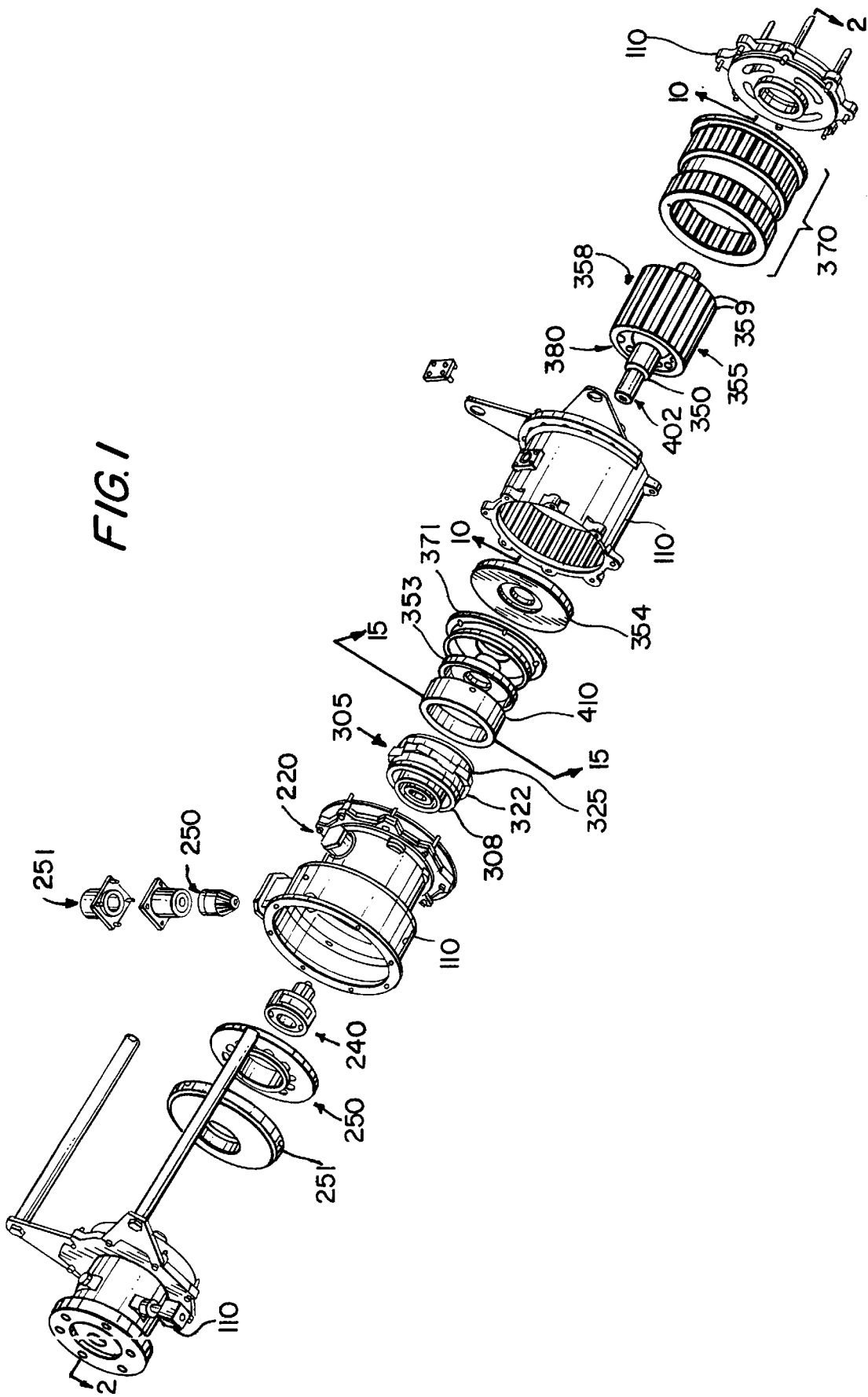
FIG. 1 is an exploded perspective view of the transmission according to the invention.

The present invention reduces instability and chatter in a transmission equipped with a Weston brake. The present invention also reduces leakage of transmission fluid. Finally, the present invention extends the effective life of the Weston brake.

As explained in more detail below, the present invention preferably accomplishes these reductions of chatter by reducing friction in one location and reducing movement in another location, as compared to a conventional transmission incorporating a Weston brake. The transmission preferably has a casing, an input drive section, and an output drive section. To reduce chatter caused by axial friction between the output cam and the spline of the output shaft, a ball spline is provided between the output cam and the output shaft in place of a conventional spline to reduce friction at that location. To reduce chatter caused by angular rotation of the input and output cams about axes other than the shaft axis, or by relative translational movement of the cams, a stabilizer ring bearing on both the input cam and the output cam, which adds damping, is provided.

The input drive section, which is adapted for rotary drive by the motor, preferably includes an input shaft, a bidirectional brake which is spring applied and may be hydraulically released, and a planetary gear reduction section.

The input shaft is driven by the motor. The input shaft preferably transmits rotational force from the motor to the planetary gear reduction section.

In a preferred embodiment of the invention a manual drive bevel gear may also be provided. The manual drive bevel gear holds the ring gear in the planetary gear reduction section fixed during rotation of the sun and planet gears of the planetary gear reduction section.

In one embodiment of the invention a flywheel is provided. The flywheel preferably accommodates stability problems that may occur in the motor which drives the transmission. At times, the motor experiences speed changes which feed back to the control of the motor in an unstable way. By adding a flywheel, the response of the transmission to motor instability is diminished.

The output section of the transmission preferably includes a loading assembly, an output shaft for transmission of rotational force to and from the load, a cylindrical brake disk carrier, a brake disk stack, and a one-way clutch.

The loading assembly preferably includes an input cam and an output cam. Each cam has a set of ramps at the interface between the two cams. The input cam is driven by the planetary gear reduction section of the input section.

A preload force is provided by a plurality of (preferably eight) compressed springs positioned between the two cams, arranged into groups of two circumferentially about the cams. The springs provide an initial bias, towards rotating the cams in opposing directions. Because of the configuration of the ramps, the initial bias causes the ramps to run up one another, thereby spreading the cams axially apart. The axial spreading preferably causes the output cam, which is free to move axially, to apply pressure to the brake disk stack. Application of pressure to the brake disk stack by the output cam may slow the rotation of the output shaft, depending on the rotational direction of the input cam, as will be explained.

During hoisting of the load, rotational force provided by the input cam is preferably transmitted directly from the input cam to the output cam, and from the output cam to the output shaft. The one-way clutch disengages the brake during hoisting such that no braking action occurs, as will be explained.

When the input cam rotates in a direction to lower the load, the first motion of the input cam overcomes the spring bias and causes the ramps to move relative to each other. This movement reduces pressure on the brake disks, thus reducing the brake retarding force and allowing the load to follow. If the load is unable to overcome system friction, the cams run out of travel and a shoulder on the input cam engages a shoulder on the output cam to force it to rotate.

On the other hand, if the motion of the load tends to override the motion of the input cam, the ramps run up on each other, forcing them to adjust their axial positions so as to put pressure on the brake disks and retard the load.

The torque supplied by the motor through the input section then forces the input cam to rotate in a direction which reduces the axial distance between the two cams. This force from the motor overcomes the bias provided by the springs and gravity upon the load, and reduces the axial distance between the cams, thereby reducing pressure on the brake and allowing the output shaft to turn. In this fashion the brake functions as a feedback mechanism since the force of gravity upon the load affects the application of the brake.

Small cylindrical antifriction rollers may be embedded in either cam so as to allow for smooth interaction between the input cam and the output cam. In the alternative, the antifriction rollers may be embedded in a carrier disposed between the two cams.

The brake disk stack preferably includes two groups of brake disks. Each of the groups is disposed about the brake disk carrier. The first group of brake disks is preferably constrained against rotating relative to the casing of the transmission. The second group of brake disks is preferably constrained to rotate with the brake disk carrier. The two groups preferably are interleaved with one another, preferably with one disk of each group alternating with one disk of the other group.

Each brake disk in both the first and second group is preferably free to move axially about the brake disk carrier. The braking force in the transmission is preferably created by applying axial force to the output cam, which is mechanically in contact, by means of a thrust bearing and appropriate hardware, with a single disk in one of the groups, preferably the first group, thereby compressing the brake disk stack and causing frictional contact between the brake disks in the two groups of brake disks. Because one set of brake disks is constrained to rotate with the brake disk carrier and one set of brake disks is constrained against rotating relative to the casing, the result of that frictional contact is braking between the casing and the brake disk carrier.

Braking of the output shaft, and thus the load, preferably only occurs, however, when the output shaft is constrained to rotate with the brake disk carrier. The constraint of the output shaft to the brake disk carrier is controlled by the aforementioned one-way clutch. Preferably, the one-way clutch may either constrain the output shaft to rotate with the brake disk carrier, or allow the output shaft to rotate independently of the brake disk carrier, regardless of whether or not the brake is applied.

As explained above, friction in the spline between the output cam and the output shaft has an adverse affect on the ability of the loading assembly to function smoothly, possibly causing chatter at some levels of loading and temperature. Preferably, chatter caused by axial movement of the input and output cams relative to one another is reduced by substituting a ball spline for a standard spline at the junction between the output cam and the output shaft. The ball spline substantially reduces axial friction at the junction by permitting the output cam to slide more easily over the output shaft when necessary as a result of the function of the loading assembly.

Similarly, as also explained above, there is a component of chatter caused by transverse movement, and rotational movement about axes other than the axis of the output shaft. In a preferred embodiment of the invention, reduction of chatter due to such angular movement may be accomplished by the introduction of a stabilizer ring around both of the cams which keeps them aligned with the shaft axis. The stabilizer ring is preferably fixedly attached to the outer wall of the output cam while movably pressing, preferably through a lip seal, upon the outer wall of the input cam. Though the stabilizer ring inevitably creates some axial friction on the output cam by movably connecting it to the input cam, which may be undesirable, the negligible amount of axial friction is more than offset by the damping of the loading assembly.

Alternatively, damping may be added to the loading assembly by situating one or more suitable fluid dampers (similar to shock absorbers) filled with a fluid such as air or some other suitable gas or liquid, as is known in the art, between the input cam and the output cam such that the fluid dampers act between the two cams. For example, one or more fluid dampers may be substituted for a corresponding number of the eight springs which are located between the two cams. Although it is preferred that the fluid dampers be arranged symmetrically about the axis of rotation of the cams, any number of fluid dampers may be provided in any positions as long as at least two springs arranged symmetrically relative to the rotational axis, remain. Moreover, while the fluid dampers may be used alone, it is preferred that each fluid damper be associated with an accumulator, in fluid communication with the fluid in the damper, in order to act as a reservoir to compensate for the effects of temperature as well as loss or change in the characteristics of fluid over time. In a particularly preferred arrangement, one set including one fluid damper in combination with one accumulator, can be provided, in place of each of two opposing sets of springs. In that particularly preferred arrangement, the two remaining groups of springs are symmetrically arranged relative to the rotational axis.

Typically, repeated use of the transmission causes the surfaces of the brake disks to wear, thereby changing the point where the spring bias is able to exert enough pressure to sufficiently provide a bias. However, the amount of travel of the cams is limited by the physical dimensions of the transmission and by the fact that as the springs extend, their force also decreases. In order to preserve the balance of the spring force to the desired braking force, an adjustment mechanism may be provided on the brake disk stack. The adjustment mechanism may be used to compress the brake disk stack to restore the axial dimension of the brake disk stack, and the value of the bias force to their original value prior to the onset of wear. In the absence of an adjustment mechanism, the brake disk stack would have to be completely replaced each time the brake surfaces wore down sufficiently that the distance between adjacent disks was so large that the brake was ineffective.

Frequently, transmissions are filled with transmission fluid. This requires the transmission be substantially sealed against leakage of the transmission fluid. It is important to seal the opening where the output shaft passes through the casing against leakage of transmission fluid.

Therefore, in another preferred embodiment of the invention, two seals are placed around the output shaft where it passes through the casing. The two seals are spaced apart axially so that a space is formed between them. In addition, a quantity of grease is inserted in the space formed between the two seals. The grease, which preferably has a higher viscosity than the transmission fluid, provides a back-up dam such that, should the inner seal develop a leak, any leaking transmission fluid cannot penetrate into the space occupied by the grease. In addition, if the outer seal develops a leak, any grease that escapes will cling to the shaft rather than drop away.

Figure 2:
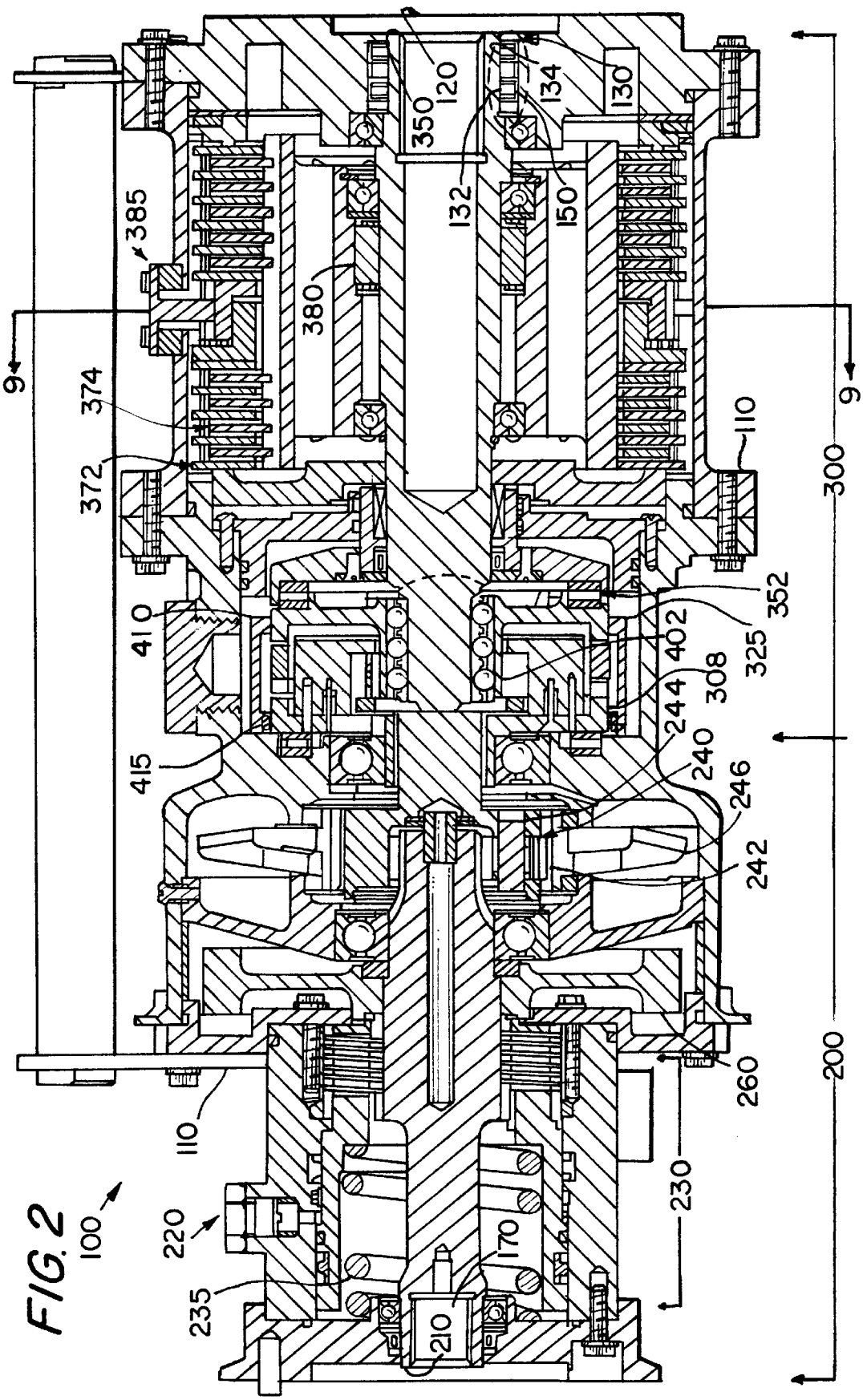
FIG. 2 is a vertical cross-sectional view of the transmission of FIG. 1 taken from line 2—2 of FIG. 1.

A transmission 100 according to the present invention preferably has a casing 110, an input drive section 200, and an output drive section 300 (see FIGS. 1 and 2). Input drive section 200 which is adapted for rotary drive by the motor (not shown), preferably includes an input shaft 210 (see FIG. 2), a bidirectional brake 230 which is spring 235 applied and may be hydraulically released, and a planetary gear reduction section 240.

Input shaft 210 is preferably driven by the motor. Input shaft 210 transmits rotational force from the motor to planetary gear reduction section 240. When transmission 100 is not in use—i.e., before transmission 100 is installed or when transmission 100 is in transit—bidirectional brake 230 preferably locks input section 200, thereby locking the entire transmission 100, and acting as a parking brake. When the user prepares transmission 100 for use, he preferably releases the bidirectional brake 230 by applying hydraulic pressure to the brake through an opening 220 in casing 110. Also, bidirectional brake 230 may act as an emergency brake, which can be invoked to stop the system rapidly in the event of failure of some other control.

Planetary gear reduction section 240 transmits force from the input shaft 210 to the loading assembly 305. Preferably, for about every 3.65 turns of input shaft 210, planetary gear reduction section 240 produces one turn to the loading assembly 305.

In a preferred embodiment of the invention a manual drive bevel gear 250 may also be provided (see FIG. 1). Manual drive bevel gear 250 holds the ring 246 in planetary gear reduction section 240 fixed during rotation of the sun 242 and planet 244 gears of planetary gear reduction section 240. If the motor drive of transmission 100 fails, manual drive bevel gear 250 may be substituted to operate the transmission 100 manually. Under such conditions, a crank (not shown) can be inserted into manual drive bevel gear opening 251, and rotated to operate the transmission 100 manually.

In one embodiment of the invention a flywheel 260 is provided. Flywheel 260 may be positioned around gear-reduction section 240. It preferably provides damping for the input section 200 as may be required by the motor control.

The output section 300 of the transmission 100 preferably includes a loading assembly 305, an output shaft 350 for transmission of rotational force to the load (not shown), a cylindrical brake disk carrier 355, a brake disk stack 370, and a one-way clutch 380.

FIGS. 3–6 show the loading assembly in detail. The loading assembly 305 preferably includes an input cam 308 and an output cam 325. Input cam 308 is preferably driven by planetary gear reduction section 240 of input section 200. The outer face 310 of input cam 308, facing away from input section 200, preferably has a rim which forms a circular array of successive ramps 315. In one embodiment, the ramps 315 form an angle 320 of about 10° relative to a plane transverse to the longitudinal axis 170 of transmission 100 (see FIG. 6). Four ramps 315 are preferably equiangularly spaced about input cam 308. The number of ramps and their respective angles can be altered without departing from the spirit of the invention.

Output cam 325 preferably has ramps 330 arranged so that ramps on the opposing cams engage one another. If one cam starts to overrun the other, one set of ramps rides up the other set of ramps, and the two cams move axially apart. Rotational force provided during hoisting of the load by input cam 308 is transmitted directly from input cam 308 to output cam 325.

Figure 3:
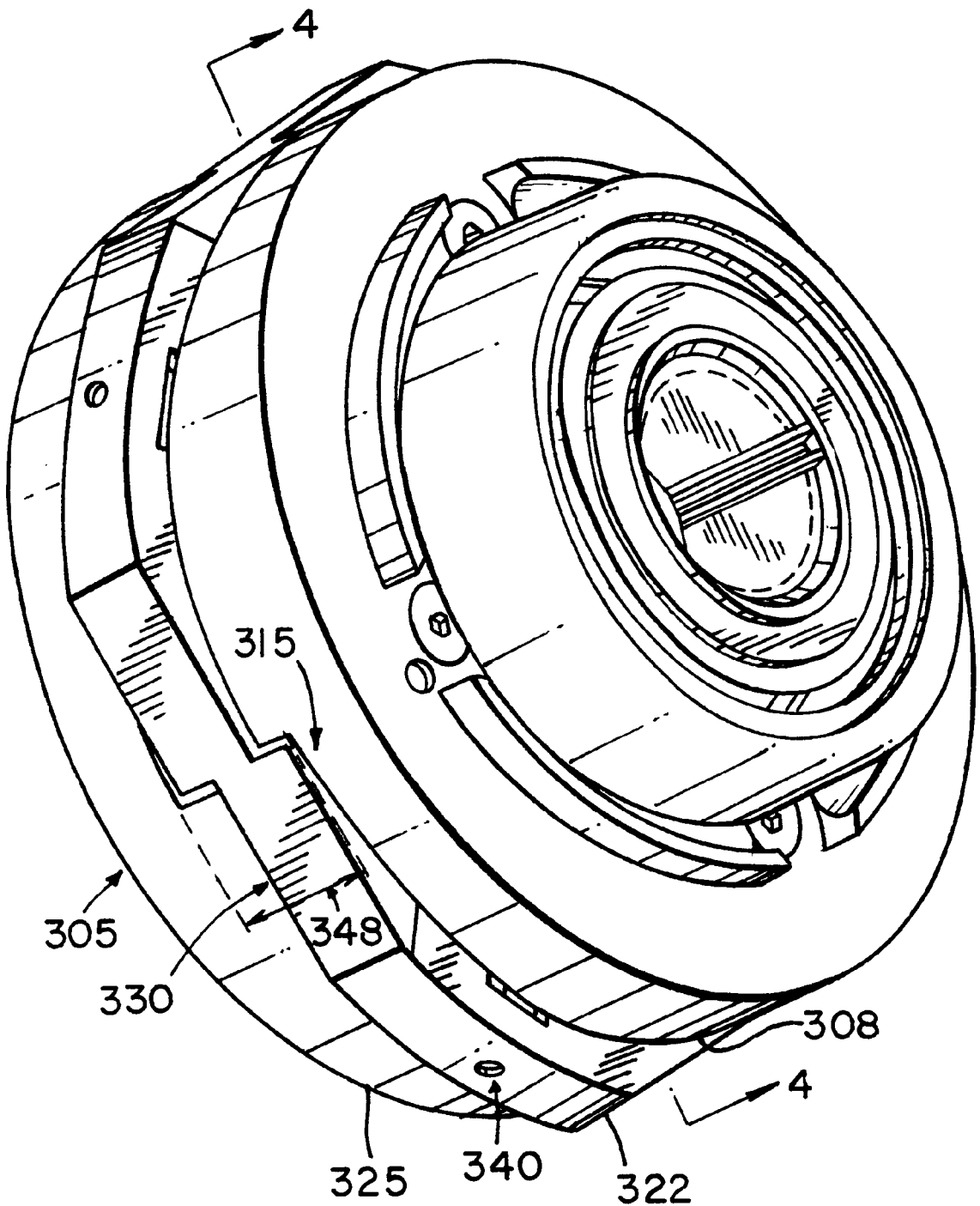
FIG. 3 is a perspective view of a portion of a loading assembly according to the invention.
Figure 4:
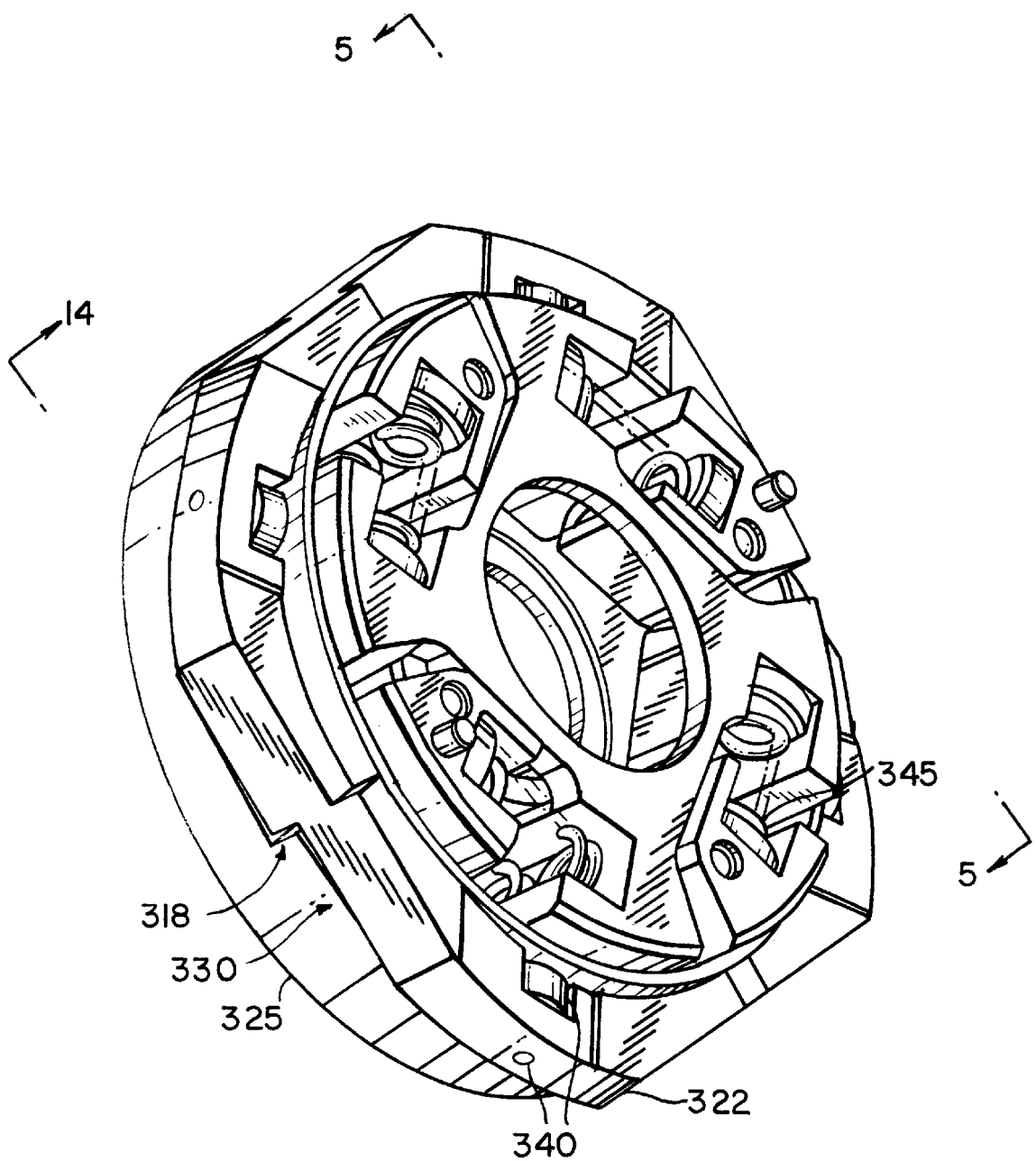
FIG. 4 is a perspective view, taken from line 4—4 of FIG. 3 of a portion of the loading assembly of FIG. 3.
Figure 5:
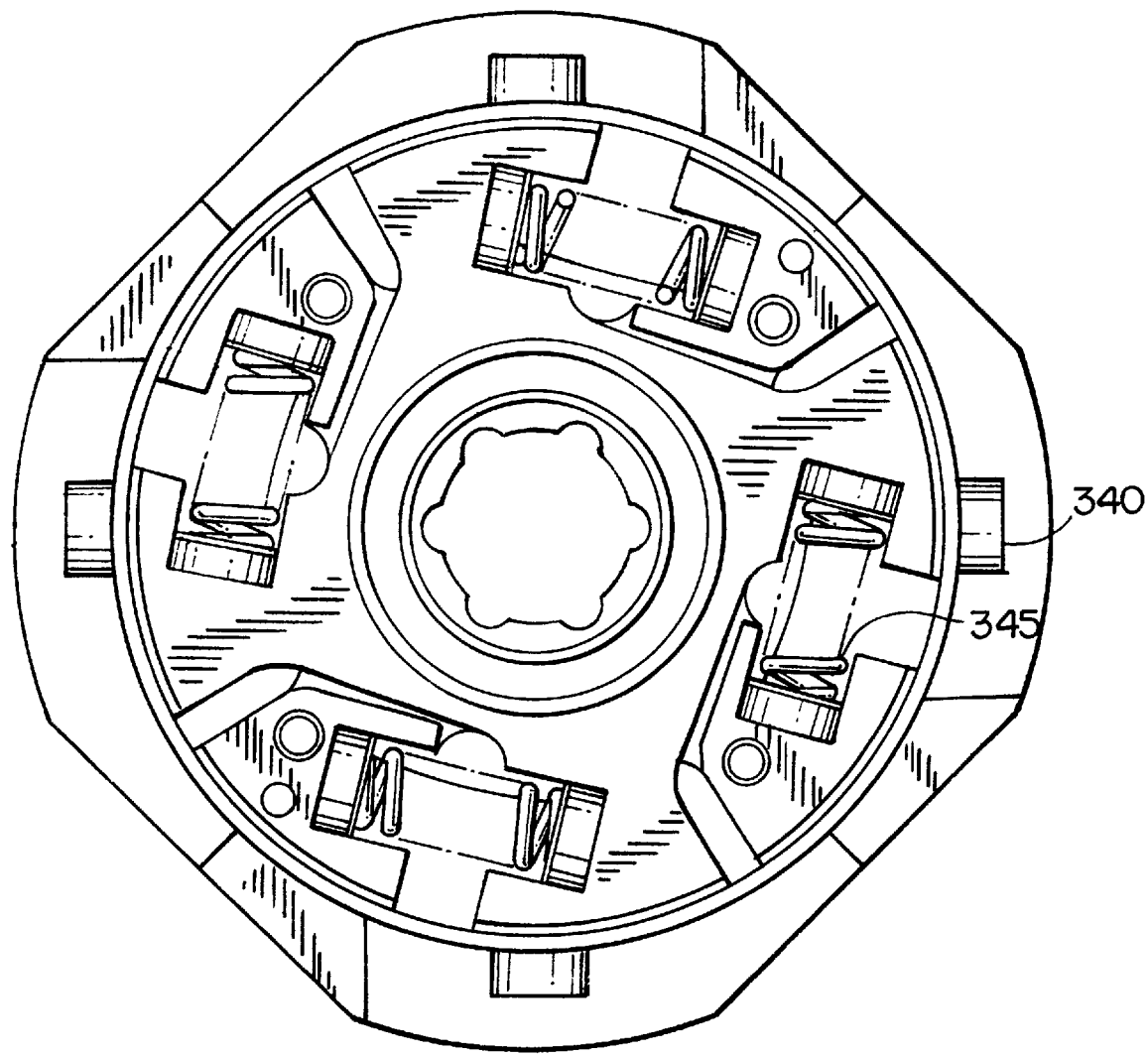
FIG. 5 is an elevational view of the loading assembly of FIGS. 3 and 4 taken from line 5—5 of FIG. 4.

In FIGS. 3–5, a carrier 322 is disposed between the two cams in order to hold antifriction rollers 340. Antifriction rollers 340 facilitate smooth operation of the brake.

Eight springs 345 are shown in FIGS. 4 and 5. Springs 345 preferably lay lengthwise in a plane which is transverse to the longitudinal axis 170 of transmission 100. Springs 345 preferably are equiangularly disposed about output shaft 350.

When input cam 308 is at rest, an opposing preload rotational bias is preferably supplied by springs 345 to the input cam 308 and output cam 325, respectively.

The initial bias spreads the cams axially apart. The axial spreading preferably causes output cam 325, which is free to move axially, to apply pressure to brake disk stack 370. The application of pressure to brake disk stack 370 by output cam 325 may slow the rotation of output shaft 350 as will be explained.

During hoisting of the load, rotational force provided by input cam 308 is preferably transmitted directly from input cam 308 to output cam 325, and from output cam 325 to output shaft 350. One-way clutch 380 disengages the brake during hoisting such that no braking action occurs.

When input cam 308 rotates in a direction to lower the load, the first motion of input cam 308 overcomes the spring bias and causes the ramps to move relative to each other. This movement reduces pressure on the brake disks, thus reducing the brake retarding force and allowing the load to follow. If the load is unable to overcome system friction, the cams run out of travel and a shoulder 318, as shown in FIGS. 4 and 6, on input cam 308 engages a shoulder 318 on output cam 325 to force it to rotate.

On the other hand, if the motion of the load tends to override the motion of input cam 308, the ramps run up on each other, forcing them to adjust their axial positions so as to put pressure on the brake disks and retard the load.

The torque supplied by the motor through the input section then forces input cam 308 to rotate in a direction which reduces the axial distance between the two cams. This force from the motor overcomes the bias provided by the springs and gravity upon the load, and reduces the axial distance between the cams, thereby reducing pressure on the brake and allowing output shaft 350 to turn. In this fashion the brake functions as a feedback mechanism since the force of gravity upon the load affects the application of the brake.

As mentioned above, antifriction rollers 340 may be located on a carrier 322 disposed between the two cams, as shown in FIGS. 3 and 4. In the alternative, small cylindrical antifriction rollers 335, as shown in FIG. 6, may also be embedded in either cam so as to allow for smooth interaction between input cam 308 and output cam 325, and carrier 322 may be omitted.

Figure 7:
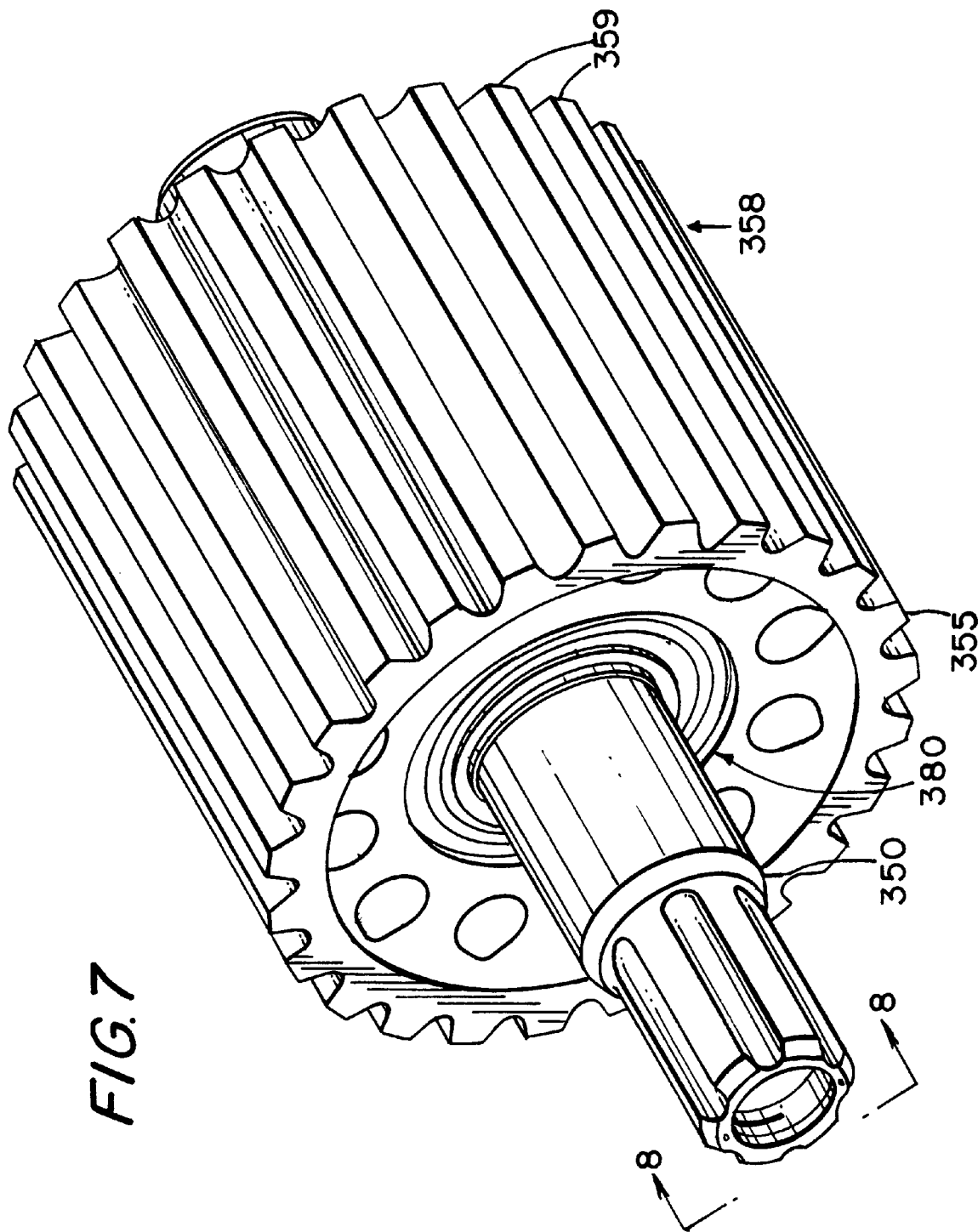
FIG. 7 is a perspective view of the output shaft, brake disk carrier and one-way clutch of a transmission according to the invention.
Figure 10:
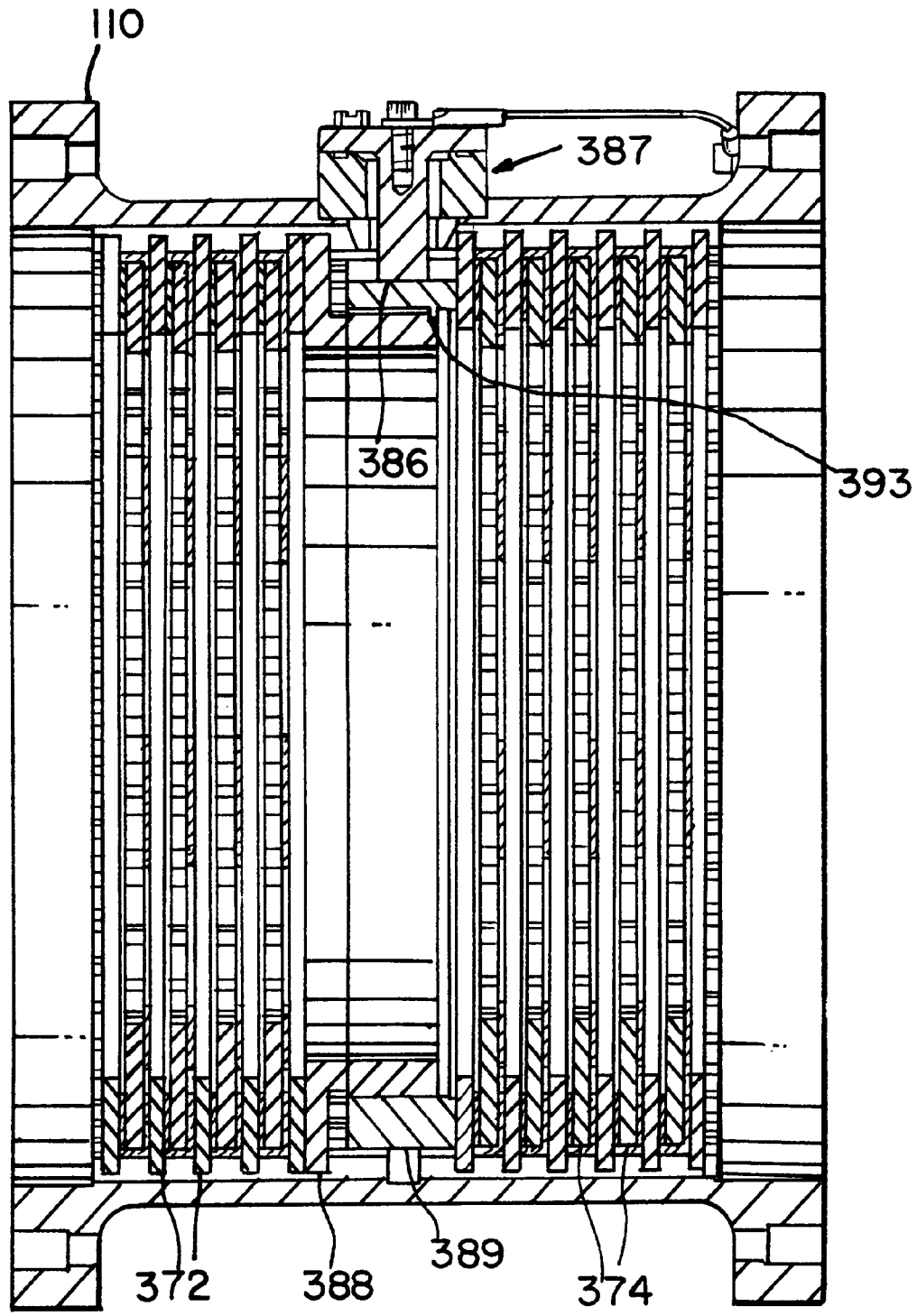
FIG. 10 is a cross-sectional view, taken from line 10—10 of FIG. 1, of the brake disk stack of the transmission according to the invention with the brake disk carrier removed.
Figure 11:
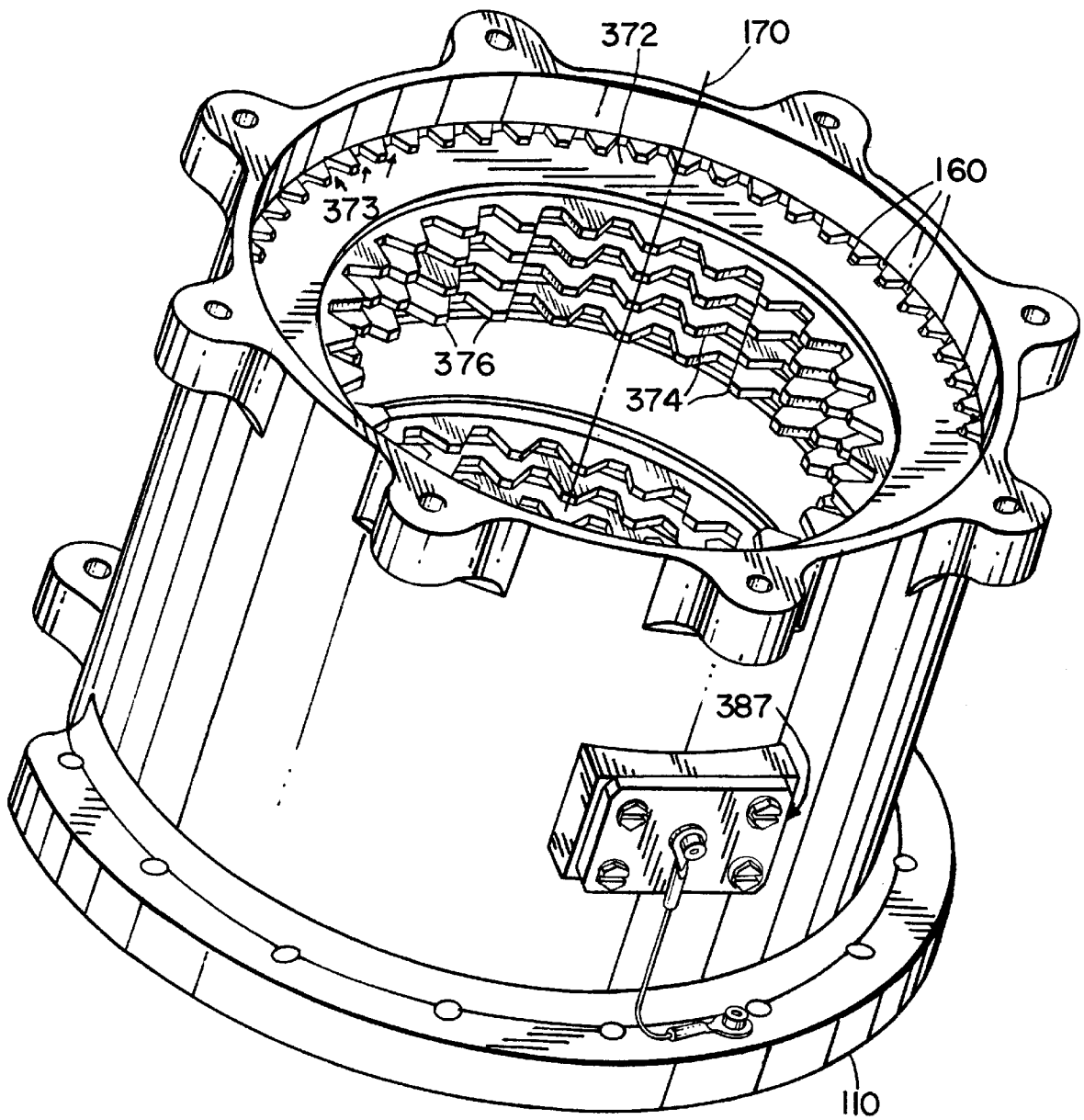
FIG. 11 is a perspective view of the brake disk stack of a transmission according to the invention.

As shown in FIG. 7, the cylindrical brake disk carrier 355 is preferably disposed about the one-way clutch 380 which, in turn, is disposed about output shaft 350. Brake disk stack 370 includes two groups of brake disks 372, 374 (see FIGS. 10 & 11). Each of the groups are preferably disposed about the brake disk carrier 355 as shown in FIGS. 10 and 12.

First group of brake disks 372 is preferably constrained against rotating relative to casing 110 of transmission 100.

Figure 12:
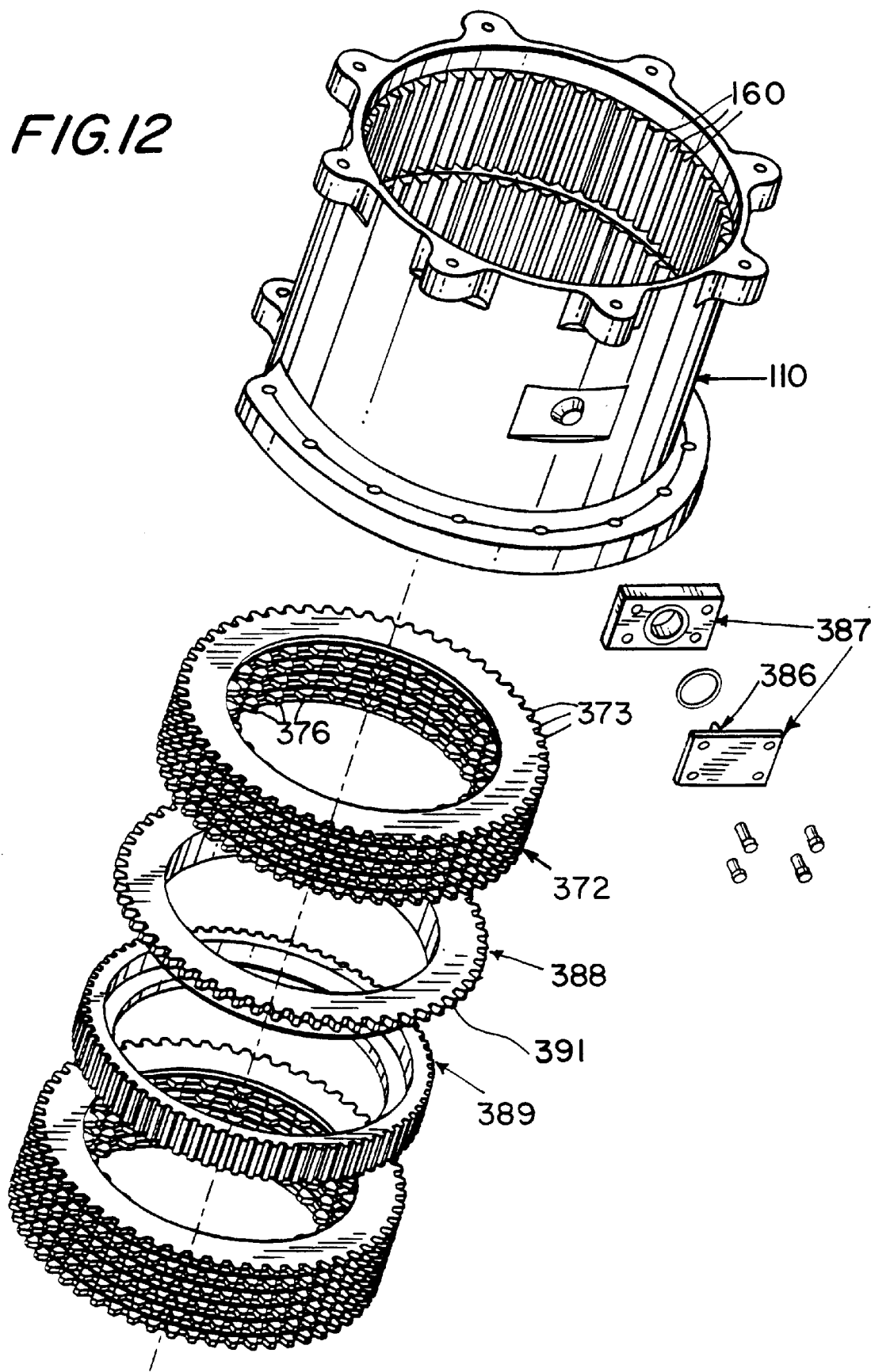
FIG. 12 is an exploded perspective view of the brake disk stack of FIG. 11.
Figure 13:
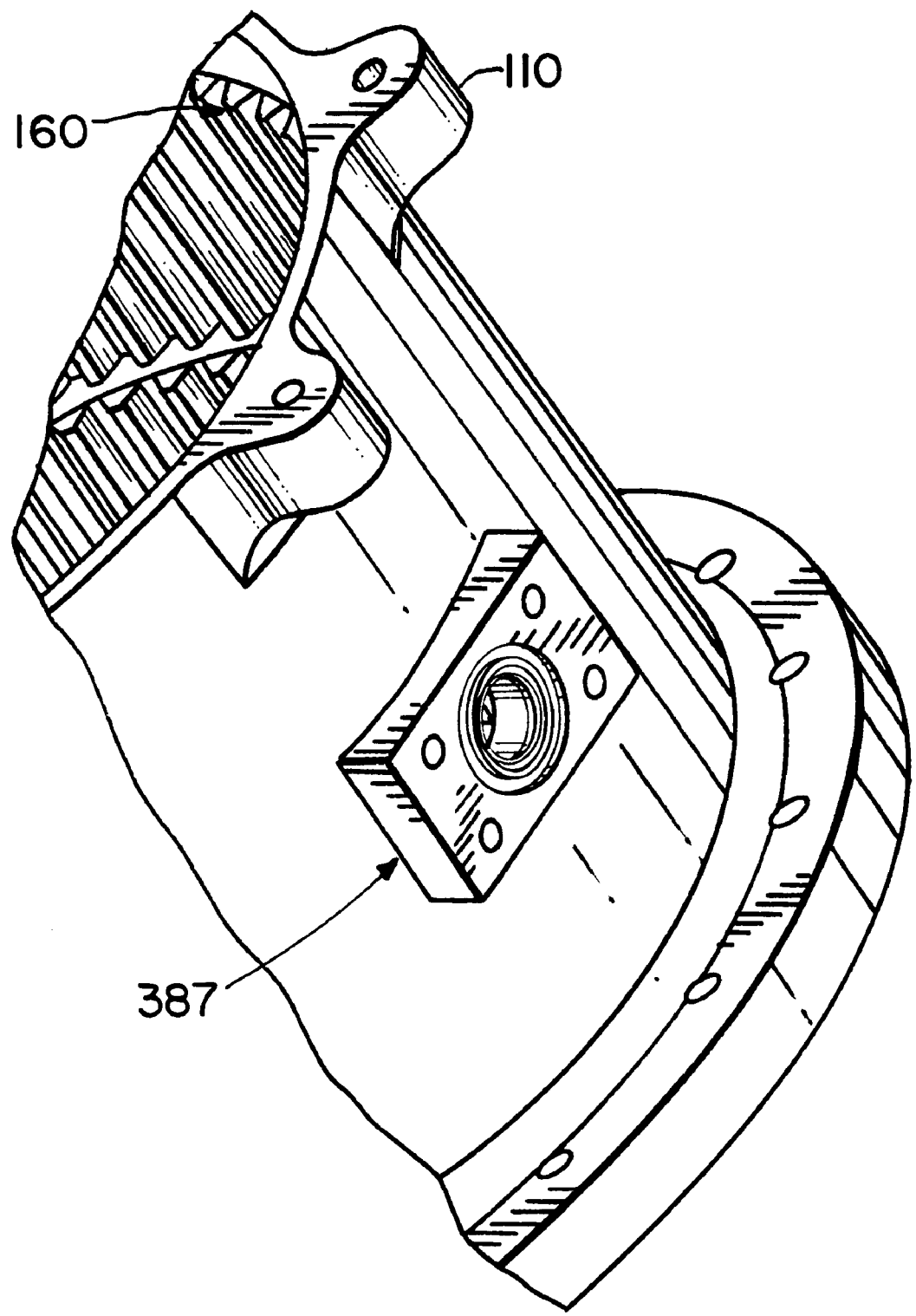
FIG. 13 is fragmentary perspective view of the housing for the adjustment mechanism.

One preferred method of constraining the first group of brake disks 372 against rotating relative to casing 110 is by forming spline teeth 373 preferably evenly spaced around the outer edge of first group of brake disks 372 (see FIG. 12). Mating spline teeth 160 are preferably formed in casing 110 whereby spline teeth 373 from first group of brake disks 372 fit into mating spline teeth 160 in casing 110 (see FIGS. 12 and 13).

The second group of brake disks 374, which alternates with the first group about brake disk carrier 355, is preferably constrained to rotate with brake disk carrier 355. As shown in FIG. 7, the outer surface 358 of brake disk carrier 355 preferably has female splines 359 which mesh with male splines 376 on the inner surface of second group of brake disks 374. Therefore, when second group of brake disks 374 are installed about brake disk carrier 355, second group of brake disks 374 is constrained to rotate with brake disk carrier 355.

Each of the first and second group of brake disks 372, 374 are preferably free to move axially relative to brake disk carrier 355. The braking force in transmission 100 is created by applying axial force to output cam 325, which is mechanically in contact, by means of a thrust bearing 352, as shown in FIG. 2, with first group of brake disks 372, thereby compressing brake disk stack 370 and causing contact between the two sets of brake disks 372, 374. A support plate 353 for the housing of the thrust bearing 352, as well as a loading plate 354 that loads brake disk stack 370 in response to pressure from thrust bearing 352, is shown in FIG. 1.

Although braking action may occur, it preferably affects the rotation of output shaft 350 only when output shaft 350 is constrained to rotate with brake disk carrier 355. The constraint of brake disk carrier 355 to output shaft 350 is implemented by one-way clutch 380. One-way clutch 380 may either constrain output shaft 350 to rotate with brake disk carrier 355, or allow output shaft 350 to rotate independently of brake disk carrier 355, irrespective of the operation of the brake.

One-way clutch 380 may be a sprag clutch, or any other suitable one-way clutch as is well known in the art. The one-way clutch preferably is disposed between output shaft 350 and brake disk carrier 355. One-way clutch 380 is engaged so that during lowering of the load, output shaft 350 is constrained to rotate with brake disk carrier 355. Therefore, if the brake is applied because output shaft 350 starts to overrun input shaft 210, the brake will slow output shaft 350 until it is again rotating at the same speed of input shaft 210. However, during raising the load, one-way clutch 380 is not engaged, so that even if the brake is applied (because input shaft 210 overruns output shaft 350), output shaft 350 is not affected by the brake.

When the motor rotates input cam 308 in a rotational direction which lowers the load, a rotational force is preferably provided to input cam 308. Springs 345 transmit the rotational force to output cam 325 which turns output shaft 350. The force from output cam 325 is transmitted along two paths, as explained above. It is transmitted rotationally to output shaft 350, and axially (if output cam 350 is overrunning input cam 308) to first group of brake disks 372. The axial force results from the ramps pushing the cams axially apart. When first group of brake disks 372, which is constrained to rotate with output shaft 350 because one-way clutch 380 is engaged when transmission 100 rotates in the lowering direction, presses against the second group of brake disks 374 as a result of pressure supplied by output cam 325, friction between the disks is created and the brake slows the rotational velocity of output shaft 350.

If the friction between the disks is so great that output section 300 locks, input section 200 will continue to turn, overcoming the force of springs 345, and preferably reducing axial distance 348 (see FIG. 3) between the two cams 308, 325. This reduction in axial distance 348 reduces the subsequent axial pressure of output cam 325 on first group of brake disks 372 such that the braking force on output shaft 350 is lessened. When lowering the load, input cam 308 is driven by the motor such that the pressure on the brake disks is unloaded. As input cam 308 is driven ahead, the brake relaxes, and the load is permitted to follow. In this manner, output section 300 works as a regulating servo.

If the reduction in axial pressure is insufficient to unlock output section 300, input section 200 preferably continues to turn, and bumps output section 300 on the interlocking flat shoulders of the respective ramps 315, 330 on each of the cams (see FIG. 3). This bumping mechanically forces output section 300 to turn in the lowering direction.

When the motor rotates input cam 308 in a rotational direction which hoists the load, the rotational force is preferably transmitted from input cam 308 to output cam 325, as discussed above. Output cam 325 then transmits the force to output shaft 350. One-way clutch 380, at the junction between output shaft 350 and brake disk carrier 355 allows output shaft 350 to overrun brake disk carrier 355 and to rotate independently of brake disk carrier 355. When the load is being hoisted, the brake disks may be locked against one another because springs 345 between input cam 308 and output cam 325 are being aided by the rotational force of input section 200, thereby maximizing axial distance 348 between input cam 308 and output cam 325. However, rotation of output shaft 350 is unaffected because one-way clutch 380 allows it to rotate independently of the brake.

During hoisting, this axial distance 348 preferably produces a sufficient condition whereby the rotational force is transmitted from input cam 308 to output cam 325 through the antifriction rollers. Nonetheless, no friction is produced by brake disks 372, 374 because brake disk carrier 355 is not constrained to output shaft 350 by one-way clutch 380. Thus brake disks 372, 374 do not rotate together with output shaft 350.

Figure 14:
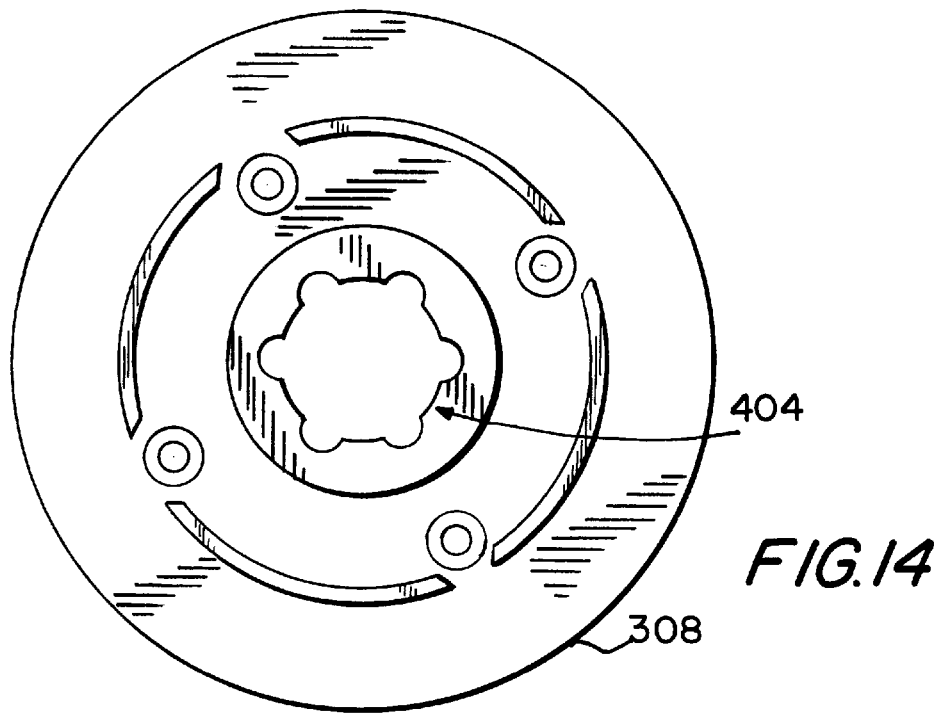
FIG. 14 is a cross-sectional view of an output cam of the loading assembly of a transmission according to the present invention taken from line 5—5 of FIG. 4.

Whether lowering or hoisting the load, friction in the junction 405 between output cam 325 and output shaft 350 has an adverse affect on the ability of the loading assembly 305 to function smoothly, possibly causing chatter at some levels of loading and temperature. Reduction of chatter caused by axial movement of input and output cams relative to one another preferably is accomplished by substituting a ball spline for a standard spline at the junction 405 between output cam 325 and output shaft 350. Preferably, output shaft 350 configured as the male part of a ball spline is shown in FIGS. 7 and 8. The output cam opening 402 is preferably configured as the female part of a ball spline to receive the end of the output shaft 350, as shown in FIGS. 2 and 14. The introduction of the ball spline results in a dramatic improvement of system stability, and a substantial reduction of chatter.

Figure 15:
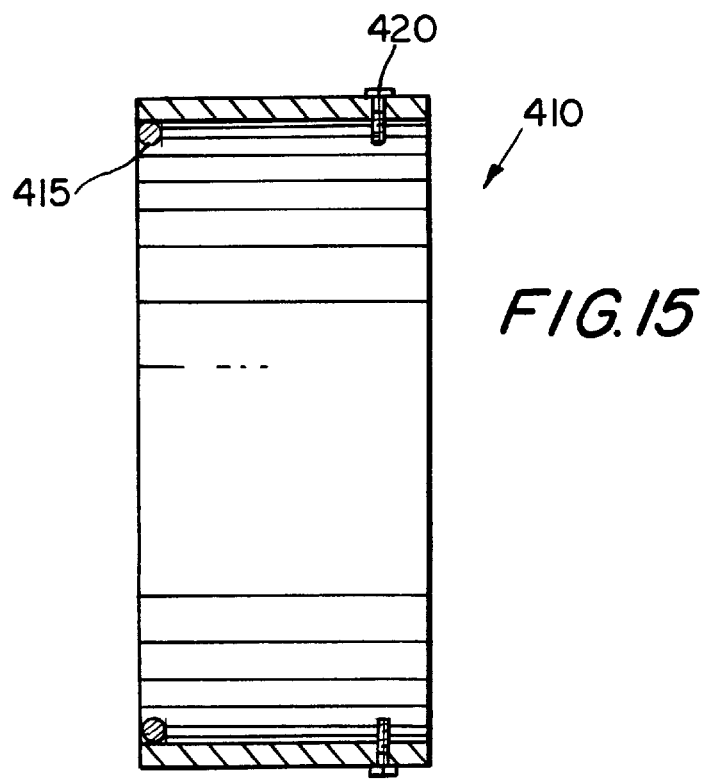
FIG. 15 is a cross-sectional view, taken from line 15—15 of FIG. 1, of a stabilizer ring for reducing chatter in a transmission according to the present invention.

Though the ball spline minimizes instability introduced to the system by axial friction, sometimes it is necessary to introduce damping to the servo system to assure its stability over the full range of operating conditions due to the angular movement about axes other than longitudinal axis 170 and movement transverse to longitudinal axis 170 of transmission 100 by loading assembly 305. In a preferred embodiment of the invention, damping may be accomplished by the introduction of a stabilizer ring 410 (see FIG. 15) around both of the cams. Stabilizer ring 410 is preferably fixedly attached, as by screws 420, to the outer wall of the output cam 325 while movably pressing, by means of a lip seal 415, upon the outer wall of the input cam 308. In this fashion, an amount of damping which substantially stabilizes the system is introduced because angular movement and transverse movement by loading assembly 305 is substantially reduced. As discussed above, some axial friction is introduced to the system by stabilizer ring 410, but it is negligible.

Figure 16:
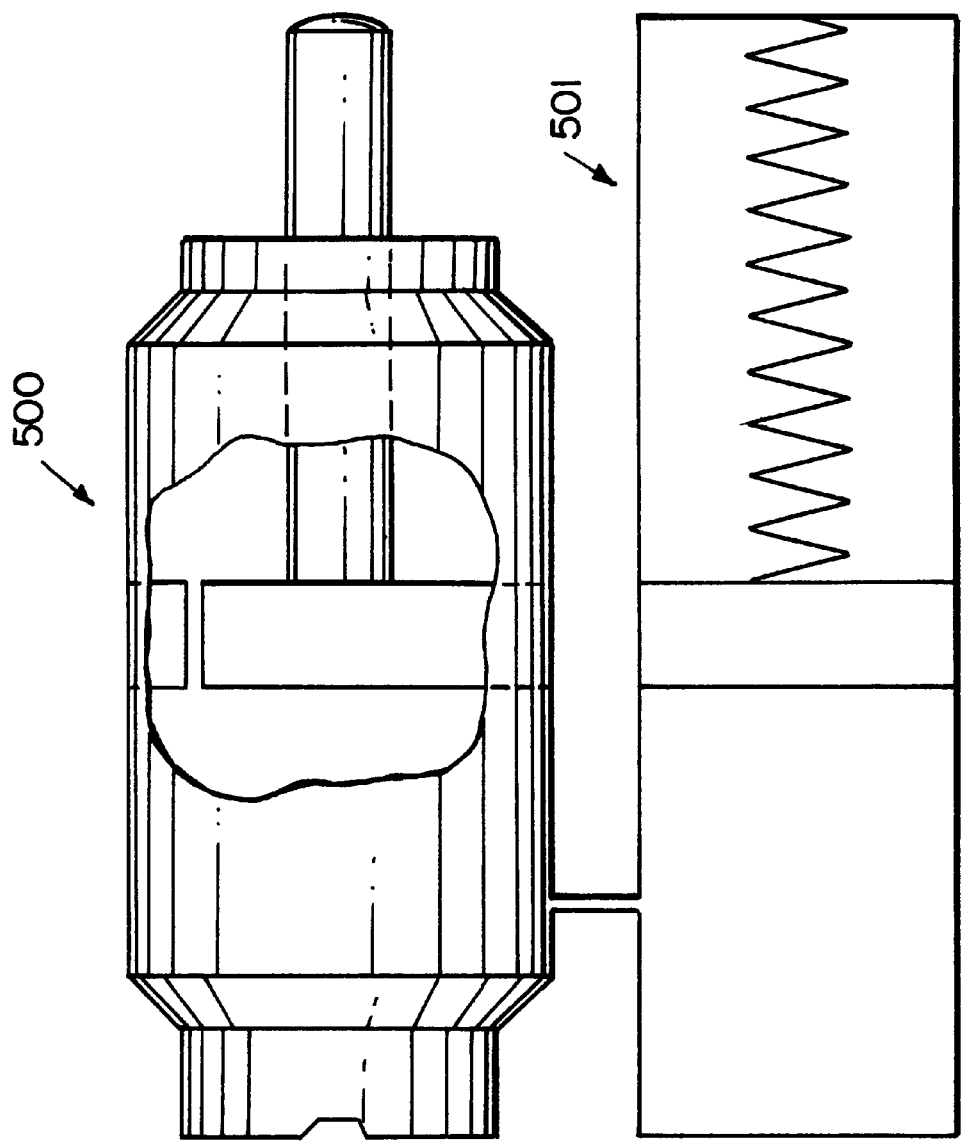
FIG. 16 is a partially fragmentary elevational view of a filled damper and accumulator for reducing chatter in a transmission according to the present invention.

In another embodiment of the invention, damping of instability caused by the angular movement about axes other than longitudinal axis 170 and movement transverse to longitudinal axis 170 of transmission 100 by loading assembly 305 may preferably be provided by one or more fluid dampers 500 (similar to shock absorbers), as shown in FIG. 16, filled with a fluid such as air or some other suitable gas or liquid, as is known in the art, acting between input cam 308 and output cam 325. For example, one or more fluid dampers 500 may be substituted for a corresponding number of the eight springs 345 which are located between the two cams. One advantage of this embodiment is that fluid dampers 500 preferably provide damping without the creation of undesirable axial friction. Although it is preferred that fluid dampers 500 be arranged symmetrically about the axis of rotation of the cams, any number of fluid dampers 500 may be provided in any positions as long as at least two springs 345, arranged symmetrically relative to the rotational axis, remain. Moreover, while fluid dampers 500 may be used alone, it is preferred that each fluid damper be associated with an accumulator 501 (see FIG. 16), in fluid communication with the fluid in fluid damper 500, which acts as a reservoir to compensate for the effects of temperature as well as loss or change in the characteristics of fluid over time. In a particularly preferred arrangement, one set, including one fluid damper 500 in combination with one accumulator 501, can be provided in place of each of two opposing sets of springs. In that particularly preferred arrangement, the two remaining groups of springs 345 are symmetrically arranged relative to the rotational axis.

Repeated use of transmission 100 causes the surfaces of the brake disks to wear, thereby increasing the braking actuation distance required to slow output shaft 350. In order to preserve the balance of axial force applied by springs 345 to brake disk stack 370 with the desired braking force, an adjustment mechanism (see FIGS. 10–13) may be introduced to the brake disk stack. The adjustment mechanism preferably includes a pin 386, a housing 387, and two adjustment gears 388, 389.

Figure 9:
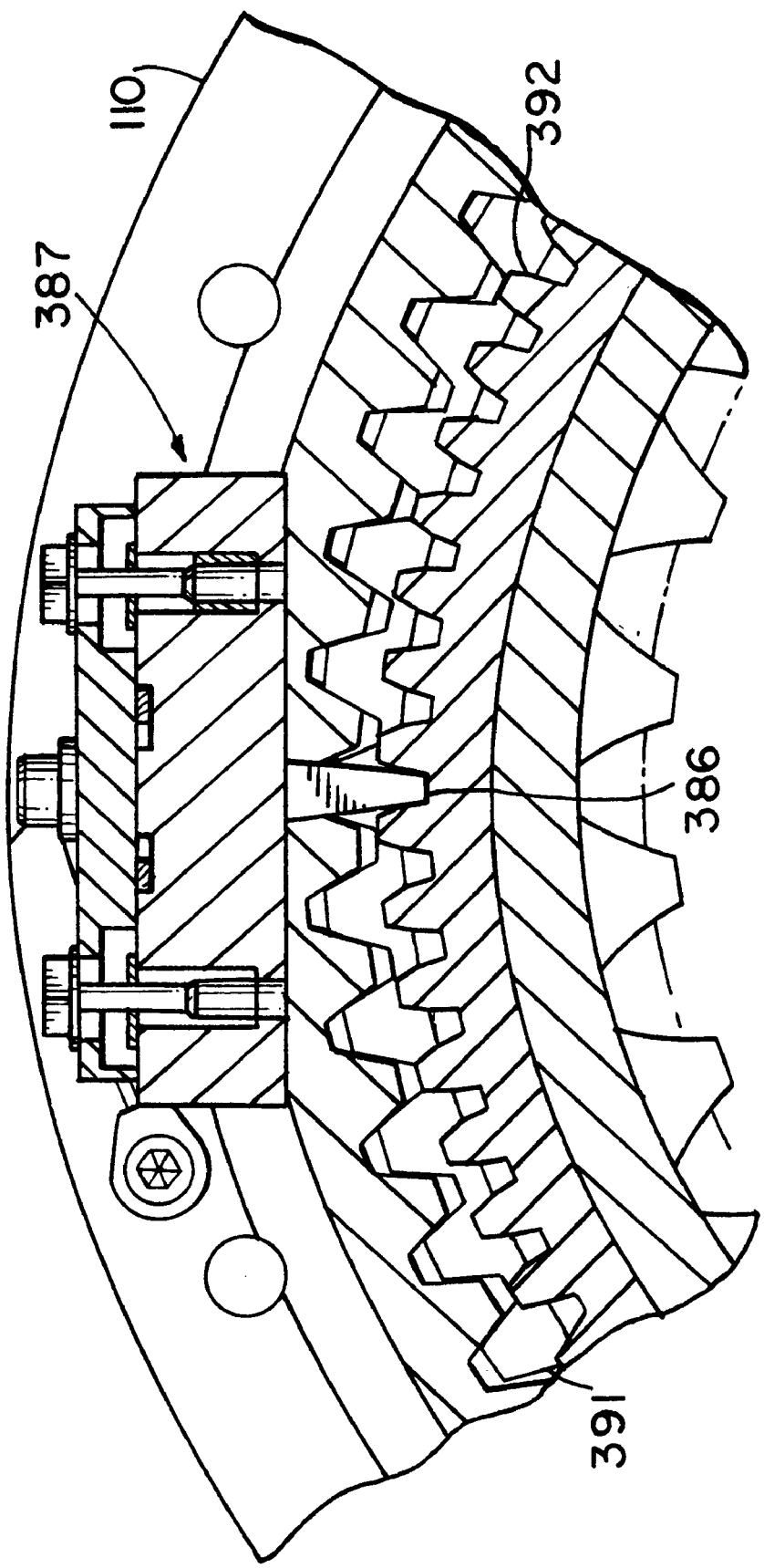
FIG. 9 is a fragmentary cross-sectional view, taken from line 9—9 in FIG. 2, of the brake disk carrier showing the pin and housing of an adjustment mechanism of a transmission according to the invention.

After the brake disks wear down sufficiently, the adjustment mechanism may be used to reduce the distances between respective brake disks. The brake surfaces should preferably be separated by a distance of about 0.07 inches (1.78 mm), which may be allowed to increase to about 0.25 inches (6.35 mm). After repeated use of transmission 100, the brake surfaces wear sufficiently that the spring bias has to be restored to its original value (see FIG. 10). A first adjustment ring 388 is free to slide axially in housing 110, but may not rotate because it is equipped with external spline teeth 391 (see FIG. 12) which engage mating spline teeth 160 in casing 110. First adjustment ring 388 also has an externally threaded cylindrical section which cooperates with an internal thread of a second adjustment ring 389 (See FIG. 10 at 393). When second adjustment ring 389 is threaded on to first adjustment ring 388, the overall dimension of the assembly of the adjustment rings depends upon how many turns the internal thread of second adjustment ring 389 has engaged the external thread of first adjustment ring 388. The outside diameter of ring 389 has adjustment spline teeth 392 which are on a smaller diameter than the mating spline teeth 160 of housing 110 (as shown in FIG. 9). A pin 386, mounted in an adjustment lock 387 engages one spline tooth space in second adjustment ring 389, and prevents it from rotating with respect to the housing, and therefore in respect to first adjustment ring 388. When adjustment is required, pin 386 is withdrawn from adjustment lock 387, and second adjustment ring 389 is threadably rotated on ring 388 until the desired axial width of the spacer formed by the combination of adjustment rings 388, 389 is established. Then pin 386 is inserted through adjustment lock 387 to engage one space in the spline on the outside diameter of second adjustment ring 389. In the absence of an adjustment mechanism, the brake disk stack would have to be completely replaced each time the brake surfaces wore down sufficiently.

As is well known, transmissions are frequently filled with transmission fluid. This requires transmission 100 be substantially sealed against leakage of the transmission fluid. It is important to seal opening 120 where output shaft 350 passes through casing 110 against leakage of transmission fluid.

Therefore, in another preferred embodiment of the invention, a seal 130 for controlling and preventing leakage of transmission fluid through the opening in casing 110 through which the output shaft passes is provided (see FIG. 2). The seal includes a first annular seal member 132 and second annular seal member 134 extending around output shaft 350. The seal members are axially spaced from one another. They may be made from a cartridge seal or other suitable seal as is known in the art.

The axial space 150 between the two seal members 132, 134 is preferably filled with a sealing medium—e.g., grease—that has a viscosity greater than the viscosity of the transmission fluid. The sealing medium provides a back-up dam such that, should first annular seal member 132 develop a leak, the leaking fluid cannot penetrate into the space occupied by the sealing medium. In addition, if second seal member 134 develops a leak, any sealing medium that escapes will cling to output shaft 350 rather than drop away.

In addition, lubrication for brake disk stack 370 and loading assembly 305 may consist of different lubricants, and are required to be sealed off from one another. Therefore, an additional seal 371 is shown in FIG. 1. This additional seal prevents of fluids between brake disk stack 370 and loading assembly 305.

Thus it is seen that a transmission with a load brake that reduces chatter as a result of axial friction, reduces chatter as a result of transverse and rotational movement along axes other than the axis of the output shaft, extends the effective life of the brake disks, and is sealed against leakage has been provided. One skilled in the art will appreciate that the present invention can be practiced by other than the described embodiments, which are presented for purposes of illustration rather than of limitation, and the present invention is limited only by the claims which follow.

What is claimed is:

1. A transmission for transmitting power from a motor to a load, said transmission comprising:

a casing;

an input drive section for rotation in said casing about a longitudinal axis, said input drive section adapted for rotary drive by said motor;

an output drive section for rotation in said casing about said longitudinal axis, said output drive section adapted for coupling to said load, said output drive section comprising:

an output shaft;

a cylindrical brake disk carrier disposed about said output shaft;

a brake disk stack, said brake disk stack including a first plurality of brake disks constrained against rotating relative to said casing, and a second plurality of brake disks constrained to rotate with said brake disk carrier, disks in said first plurality of brake disks alternating in said stack with disks in said second plurality of brake disks, said brake disks being free to move axially;

a one-way clutch disposed between said output shaft and said brake disk carrier, whereby when said output shaft rotates in a first direction said one-way clutch rotationally locks said brake disk carrier to said output shaft, and when said output shaft rotates in a second direction, opposite to said first direction, said one-way clutch allows said output shaft to rotate independently of said brake disk carrier; and a loading assembly having an input cam and an output cam, said input cam and said output cam movably connected about said longitudinal axis for axial and angular movements relative to one another, said output cam adapted for driving said output drive section and for applying axial pressure to said second plurality of brake disks, thereby compressing said second plurality of brake disks against said first plurality of brake disks;

means for reducing chatter caused by said axial movement of said input cam and said output cam relative to one another; and means for reducing chatter caused by movement of said input cam and said output cam relative to one another transverse to said longitudinal axis, and by said angular movement of said input cam and said output cam relative to one another about an axis other than said longitudinal axis.

2. The transmission of claim 1 wherein:

said casing is filled with transmission fluid of a first viscosity; and said output shaft extends through an opening in said casing;

said transmission further comprising a seal for preventing leakage of said transmission fluid through said opening, said seal comprising:

a first annular seal member extending around said output shaft; and a second annular seal member extending around said output shaft and spaced axially away from said first annular seal member, thereby forming a seal space between said first and second annular seal members; wherein:

said seal space is filled with a sealing medium having a second viscosity greater than said first viscosity.

3. The transmission of claim 2 wherein said sealing medium is grease.

4. The transmission of claim 1 wherein said means for reducing chatter caused by said axial movement of said input cam and said output cam relative to one another comprises a ball spline coupling said output cam to said output section.

5. The transmission of claim 1 wherein said means for reducing chatter caused by movement of said input cam and said output cam relative to one another transverse to said longitudinal axis, and by said angular movement of said input cam and said output cam relative to one another about an axis other than said longitudinal axis, comprises a stabilizer ring about said input cam and said output cam.

6. The transmission of claim 1 wherein said means for reducing chatter caused by movement of said input cam and said output cam relative to one another transverse to said longitudinal axis, and by said angular movement of said input cam and said output cam relative to one another about an axis other than said longitudinal axis, comprises a fluid damper acting between said input cam and said output cam.

7. The transmission of claim 6 wherein said means for reducing chatter caused by movement of said input cam and said output cam relative to one another transverse to said longitudinal axis, and by said angular movement of said input cam and said output cam relative to one another about an axis other than said longitudinal axis further comprises an accumulator in fluid communication with said fluid damper.

8. The transmission of claim 1 wherein said transmission further comprises an adjustment mechanism for extending the effective life of said brake disk stack, said adjustment mechanism comprising a pin, an adjustment lock, a first adjustment ring, and a second adjustment ring.

9. A transmission for transmitting power from a motor to a load, said transmission comprising:

a casing;

an input drive section for rotation in said casing about a longitudinal axis, said input drive section adapted for rotary drive by said motor;

an output drive section for rotation in said casing about said longitudinal axis, said output drive section adapted for coupling to said load, said output drive section comprising:

an output shaft;

a cylindrical brake disk carrier disposed about said output shaft;

a brake disk stack, said brake disk stack including a first plurality of brake disks constrained against rotating relative to said casing, and a second plurality of brake disks constrained to rotate with said brake disk carrier to said output shaft, disks in said first plurality of brake disks alternating in said stack with disks in said second plurality of brake disks, said brake disks being free to move axially;

a one-way clutch disposed between said output shaft and said brake disk carrier, whereby when said output shaft rotates in a first direction said one-way clutch rotationally locks said brake disk carrier, and when said output shaft rotates in a second direction, opposite to said first direction, said one-way clutch allows said output shaft to rotate independently of said brake disk carrier; and a loading assembly having an input cam and an output cam, said input cam and said output cam movably connected about said longitudinal axis for axial and angular movements relative to one another, said output cam adapted for driving said output drive section and for applying axial pressure to said second plurality of brake disks, thereby compressing said second plurality of brake disks against said first plurality of brake disks;

means for reducing chatter caused by said axial movement of said input cam and said output cam relative to one another;

means for reducing chatter caused by movement of said input cam and said output cam relative to one another transverse to said longitudinal axis, and by said angular movement of said input cam and said output cam relative to one another about an axis other than said longitudinal axis;

a transmission fluid of a first viscosity for filling said casing;

an opening in said casing through which said output shaft passes;

a seal for preventing leakage of said transmission fluid through said opening, said seal comprising:

a first annular seal member extending around said output shaft; and a second annular seal member extending around said output shaft and spaced axially away from said first annular seal member, thereby forming a seal space between said first and second annular seal members; wherein:

said seal space is filled with a sealing medium having a second viscosity greater than said first viscosity.

10. The transmission of claim 9 wherein said sealing medium is grease.

11. The transmission of claim 9 wherein said means for reducing chatter caused by said axial movement of said input cam and said output cam relative to one another comprises a ball spline coupling said output cam to said output section.

12. The transmission of claim 9 wherein said means for reducing chatter caused by movement of said input cam and said output cam relative to one another transverse to said longitudinal axis, and by said angular movement of said input cam and said output cam relative to one another about an axis other than said longitudinal axis, comprises a fluid damper acting between said input cam and said output cam.

13. The transmission of claim 12 wherein said means for reducing chatter caused by movement of said input cam and said output cam relative to one another transverse to said longitudinal axis, and by said angular movement of said input cam and said output cam relative to one another about an axis other than said longitudinal axis further comprises an accumulator in fluid communication with said fluid damper.

14. The transmission of claim 9 wherein said means for reducing chatter caused by movement of said input cam and said output cam relative to one another transverse to said longitudinal axis, and by said angular movement of said input cam and said output cam relative to one another about an axis other than said longitudinal axis, comprises a stabilizer ring about said input cam and said output cam.

15. The transmission of claim 9 wherein said transmission further comprises an adjustment mechanism for extending the effective life of said brake disk stack, said adjustment mechanism comprising a pin, an adjustment lock, a first adjustment ring, and a second adjustment ring.

* * * * *